United States Patent
Carreras et al.

[11] 3,816,230
[45] June 11, 1974

[54] PROTECTIVE CONTAINER COMPRISING HEAT SEALABLE LAMINATE

[75] Inventors: Edmond J. Carreras, Media; Irving H. Custis, Philadelphia, both of Pa.

[73] Assignee: The United States of America as represented by the Secretary of the Navy, Washington, D.C.

[22] Filed: Feb. 2, 1973

[21] Appl. No.: 329,282

[52] U.S. Cl............ 161/89, 117/138.8 E, 161/150, 161/156, 161/213, 161/216, 229/3.5 R
[51] Int. Cl.............................................. D06q 1/04
[58] Field of Search ............ 161/89, 150, 170, 213, 161/216, 227, 247, 151; 117/138.8 E, 107.1; 229/3.5 R

[56] References Cited
UNITED STATES PATENTS

| | | | |
|---|---|---|---|
| 3,143,364 | 8/1964 | Klein | 229/3.5 R |
| 3,343,663 | 9/1967 | Seidler | 161/216 |
| 3,445,055 | 5/1969 | Port et al. | 161/89 |

*Primary Examiner*—George F. Lesmes
*Assistant Examiner*—James J. Bell
*Attorney, Agent, or Firm*—R. S. Sciascia; Henry Hansen; Arthur A. McGill

[57] ABSTRACT

A flexible container having a heat sealable laminated structure with layers of low density polyethylene face film, aluminum foil, nylon mesh and high density spun bonded polyethylene with aluminum coating. This laminate forms a rugged container providing environmental protection for enclosed articles.

8 Claims, 2 Drawing Figures

3,816,230

3,816,230

PROTECTIVE CONTAINER COMPRISING HEAT SEALABLE LAMINATE

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION

The present invention generally relates to packaging devices and more particularly to a packaging material suitable for providing environmental protection to aircraft engines.

Aircraft engines or other equipment on handling, shipment and storage are often subject to difficult environmental conditions and/or rough treatment. Often the storage is over an extended period of time with varying atmospheric conditions. In handling and shipping, components often experience rough treatment as well as subjecting the articles to conditions requiring environmental protection. It is therefore desirable to package components such as aircraft engines in a container that is rugged from a standpoint of handling and can provide environmental protection. Other desirable features for such a container are lightness of weight and flexibility for substantially conforming to the geometrical shape of the enclosed article. Such flexibility often permits reduction in bulk of the package; particularly when the item to be packaged has an odd shape. This can be significant where space is limited.

The present method of shipping, handling and storing aircraft engines is in sealed cylindrical metal containers made of steel. While these steel containers do provide a degree of protection for the engine against environmental conditions and rough handling, they suffer from the drawbacks of being excessively heavy, use a large amount of space and require periodic maintenance such as repainting, replacement of gaskets, etc. Should a hole be knocked in a container by a fork lift tine, replacements or repairs are facilitated with the present invention.

SUMMARY OF THE INVENTION

It is therefore a general object of the present invention to provide an improved container. It is an additional object to have the container suitable for transporting and storing aircraft engines and other equipment. Other objects are to make the container strong, light and flexible and to make the packaging sealable and of a material so as to provide environmental protection.

This is accomplished according to the present invention by providing a laminated structure adaptable to heat sealing. The laminated structure comprises successive layers of a low density polyethylene face film, aluminum foil, nylon mesh, and high density spun bonded polyethylene with aluminum coating. The material is fabricated by extrusion and adhesive bonding of the components.

DESCRIPTION OF THE PREFERRED EMBODIMENT

Figure 1:
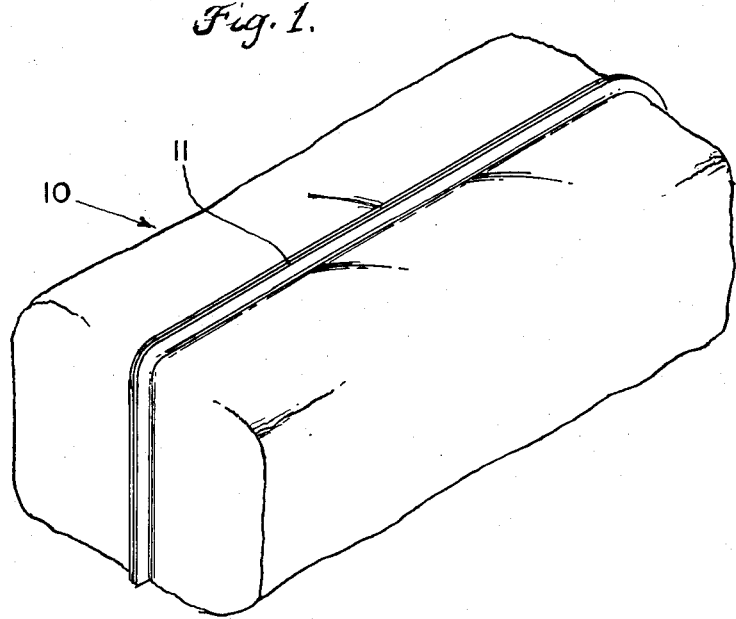
FIG. 1 is a pictorial view of the container.

Referring now to FIG. 1, there is shown a closed container 10, enclosing an aircraft engine or other device and providing environmental protection for the enclosed article. Container 10 has a heat sealed surface 11 which may be sealed by any resistance type heat sealer such as a hot bar type, band-type or a rotary sealer. The material is readily heat sealable at 500° F, 60 psi for 3 seconds.

When sealed, the container 10 is oil resistant and additionally provides protection for the enclosed item against such things as high humidity, dust, water vapor, gases and water.

Figure 2:
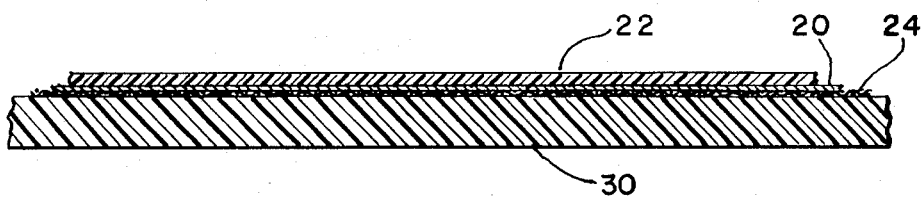
FIG. 2 is a cross-sectional view of the laminate structure of the container of FIG. 1.

Referring now to FIG. 2, there is shown a cross-sectional view of container 10. The laminate comprising container 10 is fabricated by extrusion and adhesive bonding of components. The techniques of fabrication utilized are well known to those of skill in the art.

In the construction of container 10 material, an aluminum foil 20 having a thickness of 0.00025 to 0.00035 inches is coated on both sides with a commercially available solvent based epoxy primer. The coating of epoxy primer can have a thickness of one-tenth to five-tenths mils depending on method of application. A low density (0.916 to 0.924) polyethylene face film 22 having a thickness of 0.0025 to 0.0035 inches is then extrusion coated on one side of the primer coated aluminum foil 20.

A nylon mesh 24 (22 × 22, 210 denier) is then laminated to the other side of the primer coated foil 20 using 0.0005 to 0.0015 inches of low density polyethylene (0.916 to 0.924) as the adhesive.

A material 30 having a weight of 2.7 ounces per square yard consists of a spun bonded high density (0.940 to 0.960) polyethylene 31 having a thickness of 0.010 to 0.012 inches, with an aluminum coating having a thickness of up to 0.1 mil vacuum deposited on one side of the polyethylene. The material 30 may be purchased commercially under the name Tyvek.

The material 30 is secured to the underside of the nylon mesh 24 with a layer of low density (0.916 to 0.924) polyethylene having a thickness of 0.0005 to 0.0015 inches therebetween.

The container 10 when in use has the aluminum coating of material 30 on the outside. The edges of the low density polyethylene face film 22 are the surfaces that are heat sealed together.

The laminated sheet described above has qualities making it highly suitable as an enclosure for objects other than aircraft engines that require a durable covering giving environmental protection. Its lightness of weight makes it a suitable covering for components such as electronic equipment where packaging can add an excessive amount of weight to reasonably light objects. For use with aircraft engines, the characteristics of sheet 10 make it suitable for use with an aircraft stand. The stand keeps the engine and container 10 off of the ground for added protection.

It will be understood that various changes in details, materials, steps and arrangements of parts, which have been herein described and illustrated, in order to explain the nature of the invention may be made by those skilled in the art within the principle and scope of the invention as expressed in the appended claims.

What is claimed is:

1. A heat sealable laminate for packaging comprising:
   a polyethylene face film;
   an aluminum foil affixed to said face film;
   a nylon mesh adhered to said aluminum foil;
   a material comprising high density spun-bonded polyethylene with an aluminum coating, said spun-bonded polyethylene part of said material being affixed to said nylon mesh.

2. A heat sealable laminate for packaging according to claim 1 further comprising:
   a first primer coating between said polyethylene face film and one side of said aluminum foil; and
   a second primer coating on the other side of said aluminum foil.

3. A heat sealable laminate for packaging according to claim 2 further comprising:
   a first low density polyethylene coating on one side of said nylon mesh; and
   a second low density polyethylene coating on the other side of said nylon mesh.

4. A heat sealable laminate according to claim 3 wherein said polyethylene face film has a density of between 0.916 and 0.924 and a thickness of between 0.0025 and 0.0035 inches.

5. A heat sealable laminate according to claim 4 wherein said nylon mesh is size 22 × 22 and 210 denier.

6. A heat sealable laminate according to claim 5 wherein said material further comprises:
   said high density spunbonded polyethylene has a density of between 0.940 and 0.960, and a thickness of between 0.010 and 0.012 inches; and
   said aluminum coating having a thickness of up to 0.1 mil.

7. A heat sealable laminate for packaging according to claim 6 wherein said first and second low density polyethylene coatings each have a density of 0.916 to 0.924, and a thickness of 0.0005 to 0.0015 inches.

8. A heat sealable laminate according to claim 7 wherein said first and second primer coatings each have a thickness of from 0.0001 to 0.0005 mil.

* * * * *